United States Patent [19]

Eaton et al.

[11] Patent Number: 4,854,445
[45] Date of Patent: Aug. 8, 1989

[54] WIDE RANGE ACCUMULATOR CONVEYOR

[75] Inventors: Daniel T. Eaton; George W. Benningfield, both of Louisville, Ky.

[73] Assignee: Figgie International Inc., Westlake, Ohio

[21] Appl. No.: 98,504

[22] Filed: Sep. 18, 1987

Related U.S. Application Data

[63] Continuation of Ser. No. 796,866, Nov. 12, 1985, abandoned.

[51] Int. Cl.$^4$ ............................................. B65G 13/07
[52] U.S. Cl. .................................... 198/781; 198/790
[58] Field of Search ................ 198/781, 783, 789, 790

[56] References Cited

U.S. PATENT DOCUMENTS

| 3,062,359 | 11/1962 | McGow et al. |
|---|---|---|
| 3,122,232 | 2/1964 | Burt . |
| 3,136,406 | 6/1964 | DeGood et al. |
| 3,156,345 | 11/1964 | DeGood . |
| 3,164,246 | 1/1965 | DeGood . |
| 3,170,561 | 2/1965 | Schneider . |
| 3,225,893 | 12/1965 | Currie . |
| 3,420,355 | 1/1969 | DeGood et al. |
| 3,621,982 | 11/1971 | Fleischauer et al. |
| 3,724,642 | 4/1973 | DeGood . |
| 3,768,630 | 10/1973 | Inwood et al. |
| 3,770,102 | 11/1973 | DeGood . |
| 3,840,110 | 10/1974 | Molt et al. |
| 4,103,769 | 8/1978 | Jorgensen . |
| 4,109,783 | 8/1978 | Vogt . |
| 4,174,777 | 11/1979 | Riehle . |
| 4,204,593 | 5/1980 | Leach . |
| 4,219,115 | 8/1980 | Moore . |
| 4,238,029 | 12/1980 | Pirro, Jr. . |
| 4,264,004 | 4/1981 | Harwick . |
| 4,273,239 | 6/1981 | Thwaites et al. |
| 4,293,065 | 10/1981 | Dyer et al. |
| 4,301,914 | 11/1981 | Krammer . |
| 4,383,605 | 5/1983 | Harwick . |
| 4,453,627 | 6/1984 | Wilkins . |
| 4,488,638 | 12/1984 | Morgan . |

FOREIGN PATENT DOCUMENTS

| 0095857 | 12/1983 | European Pat. Off. . |
|---|---|---|
| 67404 | 4/1982 | Japan . |
| 1500782 | 2/1978 | United Kingdom . |
| 2113638 | 8/1983 | United Kingdom . |

Primary Examiner—Robert J. Spar
Assistant Examiner—Lyle K. Kimms
Attorney, Agent, or Firm—Wood, Herron & Evans

[57] ABSTRACT

A fluid controlled and actuated belt driven, live roller, accumulator conveyor includes an improved article sensor and control valve, and accumulates articles of varying shape and weights of, for example, from less than 1 pound up to about 100 pounds with no fluid pressure adjustment. Loads of up to 300 pounds are handled merely by increasing fluid pressure and with no structural changes. An article sensor provides a significant mechanical advantage for operation of the control valve in each zone and, in conjunction with a normally open control valve, provides an accumulator for handling such wide range of article weights. A brake is pivoted directly on a tension roller pivot to brake an article when the tension roller is dropped out.

17 Claims, 2 Drawing Sheets

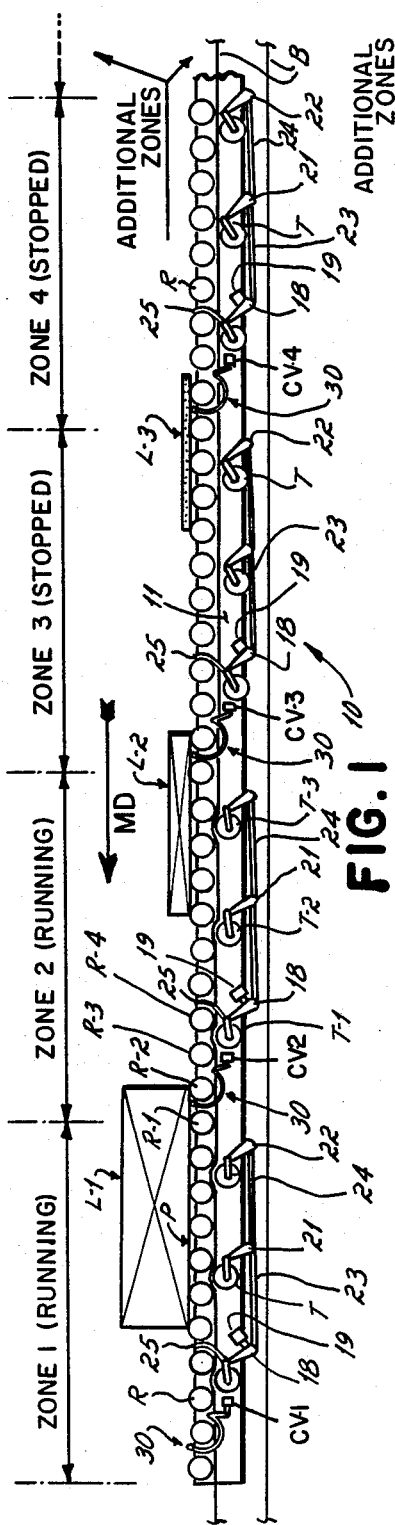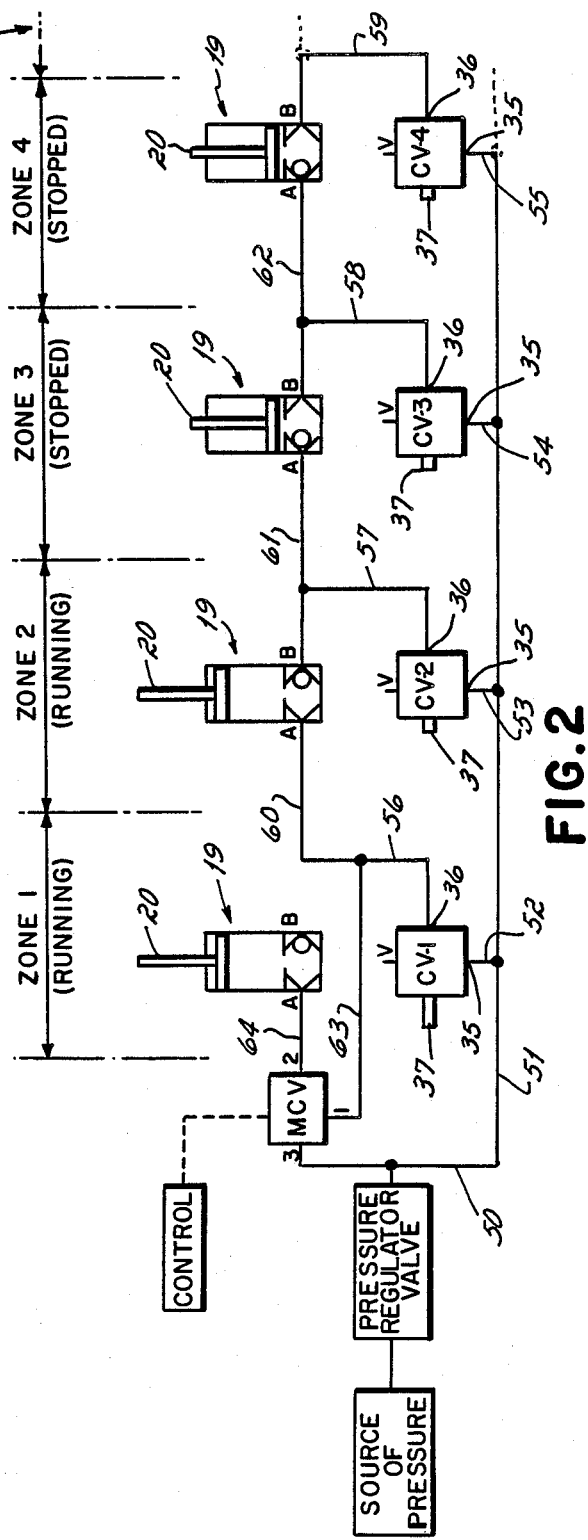

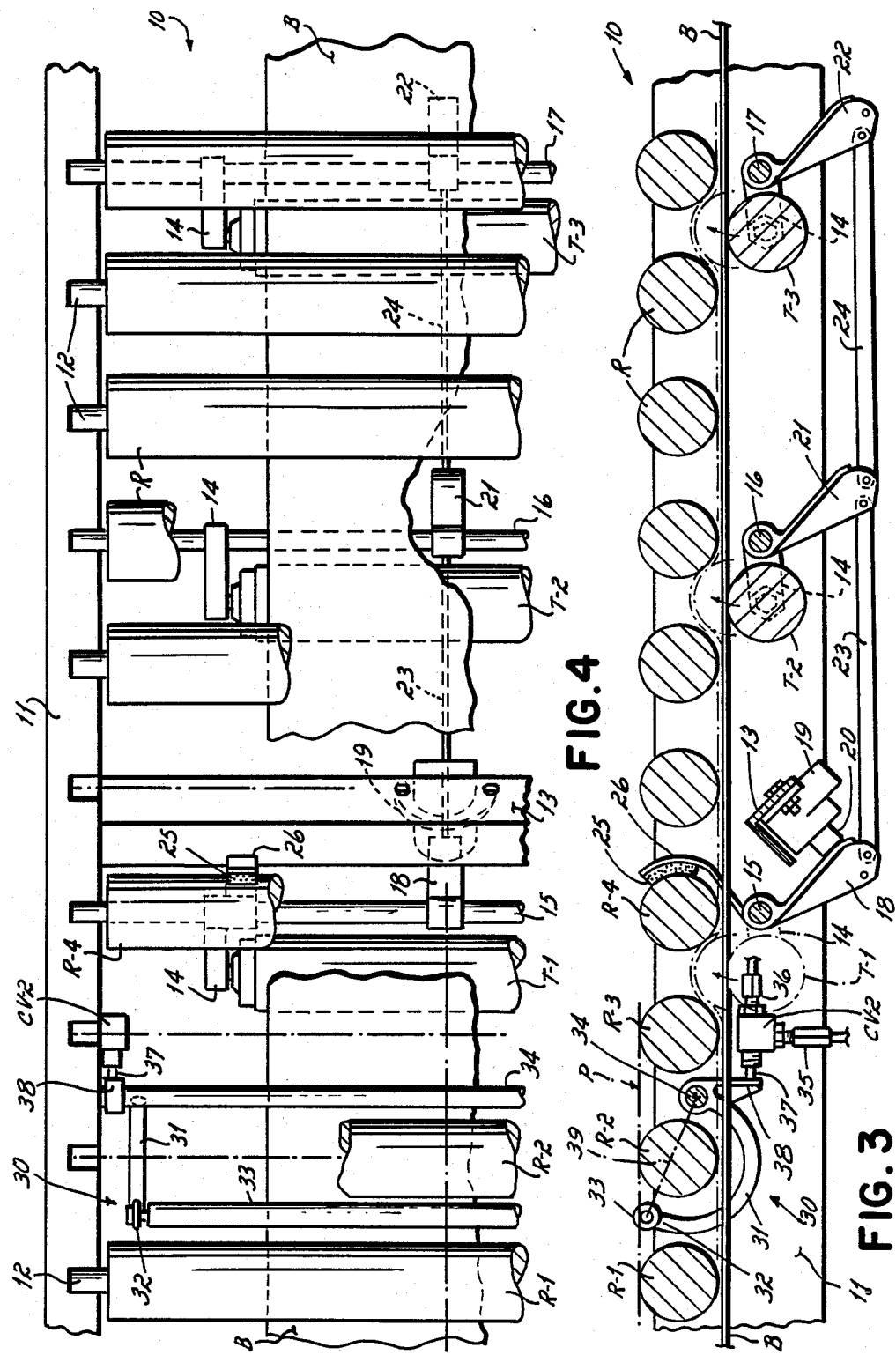

WIDE RANGE ACCUMULATOR CONVEYOR

This is a continuation of application Ser. No. 796,866, filed Nov. 12, 1985, now abandoned.

This invention relates to accumulator conveyors, and more particularly to fluid controlled and actuated, belt driven, live-roller accumulator conveyors having multiple accumulation zones for accumulation of articles along the conveyor.

In article handling systems, it is frequently necessary to accumulate articles in an article pass line due to a downstream delay, an upstream surge, a desire for temporary storage, or for several other reasons. This has been accomplished in the past, by accumulator conveyors comprising a plurality of accumulation zones. Each zone includes a plurality of load carrying rollers and devices to start and stop rotation of such rollers, independently of the rollers of other zones, in response to control signals.

Typical past accumulator conveyors of this type have taken the form of belt driven, live-roller accumulation conveyors. In such conveyors, a single, common, drive belt is disposed beneath the rollers of each zone. Selected tension rollers, beneath the belt, are urged upwardly to force the portion of the belt underlying a specific zone against the load carrying rollers to drive them and any articles thereon. The tension rollers of each zone are raised and lowered independently of the tension rollers of other zones and are controlled by article sensors disposed in the zones. The actuators are typically disposed toward sides of the conveyor and lift one end of a tension roller, for example, to raise the belt. Thus, such tension rollers move from an inclined position towards a horizontal position as they are raised.

A fluid, such as compressed air, has been used to lift the tension rollers by means of air cylinders and as well as to provide pneumatic actuating control for such cylinders. For example, in one known conveyor, a normally closed control valve is mechanically held open by a spring, against the normal weight of a signal apparatus and the air pressure therein, thus passing pressurized air to an actuating cylinder to raise the tension rollers and belt in a zone to drive the zone. The control valve is closed upon sensing of an article by a sensing device, which mechanically overcomes the spring to close the valve, vent the cylinders and thus drop out the tension rollers permitting the zone to stop.

While such accumulation conveyors have provided many advantages, they also present a number of problems, not the least of which is versatility. Specifically, it is noted that the load carrying rollers of the various zones are driven by the frictional engagement of the belt against them. The tension rollers must urge the belt against the rollers with a force sufficient to drive them against their inherent inertia and friction, and the loads disposed on them by any articles thereon.

Moreover, such conveyors have relied on the same fluid pressures for actuation control. That is to say that the same fluid used to operate the actuators or cylinders is passed to them through the article operated control valves for each zone and according to the specific control circuit used.

When a normally closed control valve is used in such a conveyor, the force of the spring required to keep the valve in an open condition (so to effect zone drive) is proportional to the fluid pressure within the control valve. The spring must also be strong enough to hold up any sensing apparatus the normal weight of which is opposed by the valve actuating stem. Such sensing apparatus is typically heavy and may even involve use of a sensing roller of the same size and weight as a load carrying roller. Such heavier sensors in turn require heavier springs.

The fluid pressure within the control valve is substantially the same as that used in the actuator cylinders and thus is usually determined as a function of the anticipated conveyor loads. The pressure must be sufficient to cause fluid actuators to raise the tension rollers with enough force to press the belt against the load carrying rollers, causing enough frictional contact to drive the rollers under the anticipated loads.

Such a system substantially reduces the versatility of the accumulator in view of the fact that heavier loads require much greater fluid actuation pressures and resultant higher control pressures than do lighter loads. When an accumulator is set up to handle relatively heavy loads, for example, relatively high fluid pressures are required to initiate and maintain the belt drive contact. This also increases pressure in the control valves when they require more actuating force to operate the valves. When the conveyor is so set up, a light weight article does not possess enough inertia to trip the article sensor in a zone against such high pressures in the associated normally closed control valve. Specifically, the article cannot overcome the spring pressure necessary to hold the normally closed control valve open for zone driving against the relatively high fluid pressures in the valve being passed to the tension roller actuators for lifting the belt with enough force to drive the zones for heavy loads.

When the conveyor is set up for light loads, the air pressure required for effectively raising the tension rollers and belt is relatively light. Accordingly, air pressure in the control valve is also relatively light. Thus, a much lighter spring can be used to hold open the normally closed control valve. A heavy article would have no difficulty in tripping the article sensor against such a lighter spring. Nevertheless, the conveyor may not be able to convey such heavier loads in view of such lighter fluid pressures in the tension roller actuating cylinders, which pressure may not be sufficient to drive the belt with sufficient force against the load carrying rollers for moving the heavier load.

A typical complicating factor in such conveyors is the actual construction of the load sensors themselves, some of which are at great mechanical disadvantage with respect to sensed load pressures in view of the normally-closed control valves used. Moreover, many load sensors utilize roller and other structures having a great deal of internal friction and inertia which must be overcome by sensed articles. This detracts from the effective operational force conveyed articles can exert on the control valves, and at the same time requires increased drive actuator pressures. As noted herein, increased drive actuator pressures increase the fluid pressure in the control valves and even heavier balance springs are required to hold them open. This requires still greater article generated actuating forces and illustrates the compounding deleterious effect of undesirable friction inertia and overall poor mechanical advantage of the sensor device.

One further disadvantage to certain known accumulators is the end-to-end inclination of the tension rollers. While the rollers have a lower end raised to lift this belt, a single point drive of belt against the load carrying rollers rather than full belt surface contact can be the result. As a practical matter, this may decrease drive force exerted on the rollers and requires further increases in actuator pressure and attendant undesirable increases in control valve pressure.

In summary, the use of known common control and actuation fluid circuitry in such accumulators has practically prevented such conveyors from handling mixed loads throughout a wide weight range.

Accordingly, it has been one objective of this invention to provide an improved fluid controlled and actuated accumulator conveyor capable of handling a wide range of both heavy and light loads at a constant fluid pressure without adjustment.

A further consideration in such accumulating conveyors is that of article "coasting" from one zone into another. As noted above, zone stoppage is caused by "dropping out" the zone's tension rollers, thus letting the drive belt fall away from the load carrying rollers. A conveyed article on such zone has inertia and can coast across the free wheeling load carrying rollers into the next zone, possibly tripping an article sensor and making it difficult to accumulate in a zero pressure mode or to simulate as desired. While conveyor brakes have been proposed to prevent this, it is desired to provide an improved brake for a belt driven, live-roller, accumulator conveyor.

To these ends, a preferred embodiment of an accumulator conveyor according to the invention comprises a plurality of accumulation zones, each having a combination of a normally open control valve and an article sensor providing a substantial mechanical advantage with respect to actuation of the normally open control valve. Fluid pressure flowing through the valve serves to retain the valve in a normally open condition and fluid passes to the tension roller actuating cylinders to effectuate driving of the associated zone. It is not necessary to use any external or load balancing spring to hold the valve open since the normal fluid pressure flowing through the valve serves this purpose.

An article sensor in each zone includes two light-weight, curved brackets, each secured to a nylon bearing supported pivot shaft at one bracket end upstream of a load carrying roller and extending beneath the roller and upwardly on its downstream side into an article pass line plane. A light-weight sensor roller comprising a relatively small diameter axle rod and a synthetic material roller rotatable thereon is connected between the upwardly extending bracket ends for engagement by any article moving along the conveyor pass line in the zone. A normally open control valve is mounted at the side of the conveyor and a control valve stem actuating paddle is mounted on the pivot shaft for engaging and depressing the stem and closing the normally open valve against the fluid pressure flowing therethrough. Preferably, the straight line distance between the end of the brackets at the sensor roller and the pivot shaft axis is about twice or more the straight line distance between the pivot shaft axis and the point of engagement of the stem actuating paddle and the valve stem. This is made possible by the light-weight, curved brackets and provides a substantial effective mechanical advantage within the sensor over the control valve.

Zone tension rollers mounted centrally in the conveyor are actuated by a centrally mounted fluid actuator, lifting the rollers horizontally and uniformly when actuated to present the belt horizontally and uniformly against the load carrying rollers of the zone and with no side-to-side inclination. The tension rollers are mounted on brackets secured to a pivot shaft and the fluid actuator drives a drive paddle, also secured to a shaft to rotate it and lift the tension rollers. The mechanical advantage of the actuator over the tension rollers, as provided by the drive paddle, shaft, and brackets, is also at least about 2 and maximizes the effectiveness of the actuator for a given actuation pressure.

Moreover, the invention provides several other aspects of mechanical advantage over the entire conveying apparatus. For example, the use of very light-weight synthetic material as a rotatable sensor roller permits articles to roll over the sensor with little friction or other force opposition, thus not requiring increased drive force to move the articles. Also, the use of centrally mounted actuators and uniformly, horizontally-lifted tension rollers and belts maximizes the effectiveness of drive pressures exerted on the load carrying rollers for any given actuator pressure.

The commonly connected fluid control and actuating circuits are supplied by a single source of fluid pressure, such as compressed air. This pressure is controllably regulated, thus permitting the extensive versatile capacity range of the conveyor to be shifted up and down to accommodate a specific range of article weights.

While the normally open valve or the high mechanical advantage article sensor, according to the invention, can be used independently to advantage in increasing the versatility of accumulator conveyor systems, the combination of them as described provides an accumulator conveyor of substantial load versatility. For example, a belt driven, live-roller, accumulator conveyor prototype according to the invention is capable of handling loads of about 100 pounds in weight down to loads of about 1 pound or less in weight, all without any adjustment to the fluid control and actuating pressure of about 40 psi. Loads of from about 100 to about 300 pounds can be conveyed and accumulated on the same conveyor without any adjustment or change except an increase in this pressure. The load versatility is also enhanced by the other mechanical advantages provided in the invention as noted.

A surprising versatility of such a conveyor was accidentally discovered when a needle nose pliers, weighing less than 1 pound, was accidentally dropped on a prototype of the invention being used to accumulate and convey articles of 40 and 50 pounds or more up to about 100 pounds. As the needle nose pliers were conveyed along the conveyor, they tripped the sensors, causing the zones to operate the same for them in accumulation and conveying as for the much heavier articles noted.

It is also to be appreciated that the actuating and control circuitry and components thereof have been greatly simplified over past conveyors in the reduction of pressure lines, components and interconnects. The invention contemplates utilization of a combined actuator and shuttle in at least all accumulation zones upstream of a discharge zone.

In another aspect of the invention, tension rollers are mounted on second pivot shafts within each zone. A drive paddle, also connected to at least one such second pivot shaft, is rotated by an actuating cylinder to pivot the shaft for raising or dropping out the tension rollers. A load carrying roller brake is also connected to the same second pivot shaft and is pivoted forwardly when the shaft rotates to engage and brake the above load carrying roller when the tension roller drops out.

Other tension roller drive paddles in a zone are commonly interconnected so that operative engagement of one drive paddle by a cylinder controls them all. Also, in that way, the weight of each tension roller, together with forces generated by the weight of the belt and its adjusted tension, is translated to the brake on one of the second pivot shafts to increase braking effectiveness.

These and other objectives and advantages will be readily ascertained from the following description of a preferred embodiment of the invention and from the drawings in which:

FIG. 1 is a diagrammatic illustrative sketch showing a preferred embodiment of the invention in one transient stage of accumulation;

FIG. 2 is a schematic illustrating a control and actuating circuit of the invention;

FIG. 3 is an elevational view in partial cross-section of an accumulation zone of the invention; and FIG. 4 is a plan view of a portion of the accumulation zone of FIG. 3.

Turning now to the drawings, there is shown in FIG. 1 a conveyor 10 according to the invention. Conveyor 10 comprises an accumulator conveyor having discharge zone 1 and a plurality of accumulation zones identified as zone 2, zone 3 and zone 4. Optional additional zones are referred to in the drawing but are not shown. The conveyor 10 is capable of conveying and accumulating various loads thereon, such as by way of example, loads L-1, L-2 and L-3.

It should be appreciated that the depiction of the conveyor 10 in FIG. 1 shows the conveyor in an illustrative transient condition only for the purpose of describing the conveyor structure and general overall operation. Many other configurations of article sizes, article disposition on the conveyor, and transient conditions are possible.

Each of the zones includes a plurality of load carrying rollers designated by the letter R, with certain of the rollers designated as R-1 through R-4, as seen with respect to zone 2 for purposes of description.

FIG. 3 and 4 depict elevational and plan view of a single zone, such as zone 2, where further details of the conveyor are better seen. Other accumulation zones at the discharge zone are similar unless otherwise noted in this application.

The conveyor 10 includes a plurality of channel-shaped side rails 11 (one of which is not shown), mounted in parallel disposition. A plurality of roller shafts 12, on which the various rollers are mounted for rotation, are disposed in parallel between the side rails 11. Preferably, the roller shafts 12 simply lie in slots in the side rails 11 of the conveyor such that the load carrying rollers can be moved upwardly off the conveyor if desired. The conveyor 10 further includes at least one cross tie member 13 extending between the side rail 11 and the opposite side rail (not shown).

A plurality of tension rollers T are provided in each zone, with tension rollers T-1, T-2 and T-3 being shown in zone 2. A single common drive belt B is disposed in the conveyor between the lower surfaces of the load carrying rollers R and the upper surfaces of the tension rollers T. It will be appreciated that the belt is provided with appropriate drive and take-up or tensioning means (not shown) for driving (and adjusting the tension of) the belt in a direction opposite to the machine direction arrow MD as shown in FIG. 1. This motion of the belt tends to rotate the rollers R of the conveyor in a direction of rotation so as to convey loads in the machine direction, as indicated by the arrow MD in FIG. 1.

Each of the tension rollers T are mounted on tension roller brackets 14 which are themselves secured to tension roller pivot shafts 15, 16 and 17, as shown in FIGS. 3 and 4.

When the pivot shafts 15, 16 and 17 of each zone are rotated in a clockwise direction, they serve to move the brackets 14 and thus uniformly raise or lift the tension rollers in parallel, horizontal disposition to the dotted line positions as shown in FIG. 3. This urges the belt B toward its dotted line position (FIG. 3) for full belt contact against the underside of the load carrying rollers in the zone to thereby drive the zone. The dotted line position of belt B is exaggerated in the figures for illustrative purposes and the actual belt path may not be quite so curved over the tension rollers.

When the tension rollers are lowered or dropped out, such as by counterclockwise rotation of the shafts 15, 16 and 17, the belt in the zone is lowered to its solid line position as shown in FIG. 3. In this lowered position, the belt B is out of engagement with the load carrying rollers of the zone and thus the zone is deactivated and not driven.

Further describing the tension roller construction of the conveyor zones, a drive paddle 18 is secured to the pivot shaft 15 such that when the drive paddle 18 is rotated, it imparts rotation to the shaft 15 and to the brackets 14. Attached to cross tie 13 is a fluid driven actuator 19, comprising a fluid driven, extensible piston 20, positioned to engage the drive paddle 18 such that upon extension of the piston 20, the drive paddle is urged in a clockwise direction. Upon retraction of the piston 20, the drive paddle is permitted to rotate in a counterclockwise direction, and is so urged by the weight of at least tension roller T-1. Accordingly, the extension of the piston 20 caused by fluid pressurization of the actuator 19, causes the drive paddle 18 and the pivot shaft 15 to rotate in a clockwise direction, thus raising the tension roller T-1 and urging the belt B upwardly against the rollers R-3, R-4 and other adjacent rollers in the zone.

Similarly, tension rollers T-2 and T-3 of each zone are mounted on the respective roller pivot shafts 16 and 17. Secured to the shafts 16, 17 are further drive paddles 21, 22, respectively, such that rotation of the drive paddles 21, 22 rotates respective pivot shafts 16, 17 and thus raises tension rollers T-2 and T-3 beneath the belt B to urge the belt B into engagement with further rollers R in the zone. This action drives the load carrying rollers so as to drive any loads thereon along a pass line plane P (as identified in FIG. 3) in the direction MD.

The drive paddles 18, 21 and 22 are interconnected by links 23 and 24. Accordingly, clockwise rotation of drive paddle 18 by extension of the piston 20 (shown in retracted condition in FIG. 3) serves to rotate not only the drive paddle 18, but the interconnected drive paddles 21 and 22 in a clockwise direction, thus rotating the shafts 15, 16 and 17 and raising all tension rollers T-1, T-2 and T-3 in the zone at the same time. Accordingly, and for purposes of description, the entire fluid actuator 19 and the drive paddles, associated pivot shafts and tension rollers in each zone are sometimes referred to collectively as fluid actuation means.

It will be noted that the distance between the point of engagement of the piston 20 of actuator 19 with drive paddle 18 to the axis of pivot shaft 15 is about twice the distance between the same axis and the axis of rotation of the tension roller. This provides a mechanical advantage in the drive of about 2, thus maximizing the effectiveness of the actuator 19 for a given actuation fluid pressure. Moreover, it should be appreciated that the drive advantage of tension rollers T-2 and T-3 is even greater due to the longer moment arm between the axis of shafts 16 and 17 and the engagement of links 23, 24 with drive paddles 21, 22, respectively. This further enhances drive pressures generated by the actuator 19 for a given actuator fluid pressure.

With further reference to FIGS. 3 and 4, a zone brake comprising a brake shoe 25 and a brake arm 26 is also mounted on the pivot shaft 15 for engagement with the roller R-4 upon retraction of the piston 20. Such retraction, when the actuator 19 is vented, permits the shaft 15 to rotate in a counterclockwise direction. In this function, when the actuator 19 is deactivated, the weight of the tension roller T-1, together with downward forces exerted on roller T-1 due to the adjusted tension on the drive belt and the weight of the belt, tends to rotate the pivot shaft 15 in a counterclockwise direction, lowering the belt B on the tension rollers away from the load carrying rollers and at the same time urging the brake arm 26 and the brake shoe 25 toward and into engagement with the roller R-4, thus frictionally braking that roller and any load which may reside thereon.

It will be appreciated that the brake, including the shoe 25 and arm 26, is disposed on the upstream side of the roller R-4 and extends preferably to just below the pass line plane P, as shown in Fig. 3. It will also be appreciated that when the piston 20 of the actuator 19 is retracted, each of the tension rollers T-1, T-2 and T-3 are free to rotate downwardly or in a counterclockwise direction. The weight of each (and belt pressure thereon) is interconnected through the links 23 and 24 and serves to increase the frictional braking pressure exerted by the brake 25 against the roller R-4.

FIGS. 3 and 4 also depict an article sensing means and a control valve for each zone. The article sensing means 30 preferably includes two curved brackets 31 (one not shown), each having an upper end at 32. The two curved brackets are disposed on each side of the conveyor, within the side rails 11, and are mounted on a pivot shaft 34, which has ends mounted in nylon bearings at the conveyor sides to reduce rotating friction.

The curved brackets 31 extend from the pivot shaft 34 beneath the load carrying roller R-2 and then extend upwardly between the rollers R-1 and R-2 into a position adjacent or within the pass line plane P, as shown in FIG. 3. An axle of small diameter, about ¼", is mounted between the ends 32 of the brackets 31 and a light-weight sensor roller 33 is rotatably disposed on the axle within or above the pass line plane P so as to be engaged by articles moving down the conveyor. Sensor roller 33 is preferably made from a lightweight synthetic material such as polystyrene.

In accordance with the invention, a normally open control valve is provided within each zone, with each respective identical control valve referred to as CV-1, CV-2, CV-3 and CV-4, respectively. FIG. 3 depicts a control valve CV-2 shown mounted on the side rail 11 of the conveyor in zone 2. The control valve CV-2 is a normally open valve having an input 35 directly connected to a source of pressurized fluid, and an output 36 connected to the actuators 19, as will be described.

The control valves are all constructed as normally open valves and each has an extending valve actuating stem 37 which can be depressed to close the normally open valve. In a normal condition, the stem 37 is held in an extended position by air flowing through the open control valve CV-2. Depression of the stem 37 causes the control valve to close, thereby cutting off pressurized fluid present at input 35, from passage through the valve to output 36.

Also secured to the pivot shaft 34 is a control valve stem actuating paddle 38 which rotates upon rotation of shaft 34. Accordingly, it will be appreciated that when the sensor roller 33 is engaged by an article moving down the pass line P of the conveyor, the curved brackets 31 are depressed to rotate the shaft 34 in a counterclockwise direction. This motion moves the stem actuating paddle 38 in a counterclockwise direction, thereby depressing the stem 37 and closing the respective control valve.

It will be appreciated that the sensing means 30 provides a significant mechanical advantage of the article over the control valve. Specifically, it will be appreciated that a straight line 39, extending from approximately the end 32 of the bracket 31 to the axis of the pivot shaft 34, is about twice the distance from that same axis to the point of engagement of the actuating paddle 38 with the stem 37. This provides a mechanical advantage of about 2 with respect to the article over the control valve. Obviously, other constructions could be provided of substantially more mechanical advantage to further facilitate actuation of the control valve, or of less mechanical advantage depending on the parameters desired. In any event, it is unnecessary to overcome any external spring pressure, as in a system using a normally closed valve. The only valve actuating pressure required is that necessary to close the normally open valve against the pressure of air flowing therethrough (and a small amount of pressure to overcome any internal spring bias of the plunger toward its open position). And that required pressure may vary substantially depending on specific valve construction, it being preferable to select a normally open control valve having the operational capacity to handle the fluid pressure necessary for the tension roller actuators in view of the expected loads, but a control stem extension force caused by such pressure sufficient only to extend the sensing means 30 into the conveyor pass line. As an example, in a prototype capable of handling packages of from about 1 pound or less to about 300 pounds, a control valve Model No. MJVO-3, a two-position, three-way, normally open valve produced by Clippard Instrument Laboratory, Inc. of Cincinnati, Ohio has been found suitable. Such a valve is capable of handling the actuating pressures of about 40 psi as noted herein for anticipated article loads of from less than about 1 pound up to about 100 pounds. The valve is also capable of handling increased control pressures of about 60 psi (for example) required for article loads up to about 300 pounds.

This specific valve includes an internal valve spring providing a relatively weak force to extend the valve stem to a normally open position when the valve stem is not loaded by extraneous forces. The internal spring is a standard item in such a preferred valve, but is not strong enough to extend the plunger against the inherent weight of the article sensor of the invention described herein, even when there is no article load on the sensor. The preferred sensor and valve apparatus then is preferably designed for operation despite the existence or non-existence of such spring, and such spring does not comprise a load balance spring with respect to either sensor weight or fluid flow pressure in the valve.

Other normally open type valves may suffice.

Turning now to FIG. 2, the control and actuation circuit of the conveyor will be described. As shown in FIG. 2, a source of fluid pressure, such as a source of compressed air, is provided and is regulated by a pressure regulator valve connected to a supply manifold 50. Supply manifold 50 is connected to a pressure line or manifold 51 which is interconnected through lines 52, 53, 54 and 55, respectively, to the input port 35 of each control valve CV-1 through CV-4. Each control valve has a vent, marked V in the drawing, and a pressurized fluid output 36 connected to respective lines 56, 57, 58 and 59. In the zones 2 through 4, the actuators 19 are provided with two input ports A and B and a shuttle ball for sealing off one of the two input ports. In zone 1, which is the discharge zone, the actuator 19 may also have two ports A and B provided with a shuttle ball, however, port B is vented or is closed preferably as shown. Alternatively, port B of the actuator 19 in zone 1 could be connected to the line 60. In zones 2 and 3, port B of the respective actuators 19 are connected through the respective lines 61 and 62 to the A ports of the immediate upstream actuators. Port B of the actuator 19 in zone 4 is connected only to line 59 and control valve CV-4, or to a port A of another actuator 19 in an optional upstream zone (not shown).

The specific actuator 19 preferred for use constitutes a $\frac{1}{2}''$ stroke air clamp, Model No. 101S, produced by the EVEI Development Co. Inc. of Jeffersontown, Ky. Such an actuator comprises an extensible piston, fluid driven cylinder, combined with an integral shuttle valve, as shown schematically in FIG. 2, and connected together as shown in the drawing and described above. The extensible pistons 20 of each actuator are extended to engage the drive paddles 18 in each of the respective zones 1–4.

Continuing further with a description of the control and actuation of FIG. 2, manifold 50 in addition to its connection to line 51 is connected to an input port 3 of a master control valve MCV. The master control valve has also an input port 1 and an output port 2 and can be controlled by any desirable means to selectively connect either the input port 3 with the output port 2, or the input port 1 with the output port 2.

When input port 3 of the master control valve MCV is connected to the output port 2, fluid such as compressed air flows from the source of pressure through the pressure regulator valve, into the manifold 50, through the master control valve, ports 3 and 2, to port A of the actuator 19 in zone 1. Such pressurized air is operable to extend the piston 20 in zone to continuously engage the drive paddle 18 of zone 1 and thereby elevate the tension rollers of that zone 1 upwardly so as to press the belt B against the load carrying rollers of that zone and thus continuously drive the zone to move loads thereon in the direction of the arrow MD (FIG. 1), despite the condition of control valve CV-1 in zone 1.

When the MCV valve is controlled to connect input port 1 to input port 2, the actuator 19 of zone 1 is effectively connected to the control valve CV-1 for that zone through lines 56, 63 and 64. In this mode, the zone 1 will be actuated or driven only when the sensor 30 is extended into the pass line P. When the sensor 30 is depressed, the normally open valve CV-1 will be closed to vent the actuator 19 in zone 1, deactivating the zone.

Operation of the conveyor will now be described with reference to the varying loads L-1, L-2 and L-3 thereon, as shown in FIG. 1, and the position of the respective components as shown in FIG. 2. First, however, it will be appreciated that for zones 2, 3 and 4 the actuators 19 can be extended so as to drive the tension rollers upwardly and thus drive the zones when ever the control valve in the zone, or the control valve in the preceding downstream zone has its plunger 37 extended. This could occur whenever two respective loads have not depressed both the sensor 30 of the zone and of the downstream zone, respectively. For example, the actuator 19 of zone 2 is operated to extend piston 20 when pressure is presented to the actuator through either port A from control valve CV-1 or through port B from control valve CV-2. Accordingly, zone 2, for example, will be activated to drive any loads thereon when either valve CV-1 or CV-2 is in its normally open condition. Likewise, and for example, zone 3 could be activated upon the presence of any pressure at either port A, through control valve CV-2 or port B through control valve CV-3.

Looking now at the specific condition of the conveyor as shown in FIGS. 1 and 2, it will be appreciated that the master control valve MCV is positioned so as to connect input port 3 with output port 2, thus pressurizing the line 64 and port A of actuator 19 so as to constantly extend the piston 20 thereof regardless of the condition of the control valve CV-1. This insures continuous operation of the conveyor in a singulation mode, i.e., a mode wherein operation of zones 2 through 4 by the described control serves to separate loads discharging into and from zone 1.

As shown in FIGS. 1 and 2, a load L-1 has substantially traversed zone 1, but still remains partially on the sensor 30 of zone 2. This depresses the stem 37 of the control valve CV-2 to move the valve from its normally open to a closed position, thereby venting, through the vent V, any pressure in lines 61, 57, and output 36. At the same time, the control valve CV-1 remains normally open since the load L-1 has not reached the sensor 30 of the discharge zone 1. (Even if the sensor 30 of zone 1 were depressed, that zone would still run due to the override of the master control valve over valve CV-1.)

In this condition, then, the control valve CV-1 is operable to pass pressure from the manifold line 51 through its output 36 and lines 56 and 60 to port A of the actuator 19 of zone 2. This pressure extends the piston 20 so as to drive the drive paddle 18 for the tension rollers T-1 through T-3 in zone 2 and thereby lift all the tension rollers in that zone as heretofore described so as to drive zone 2.

Moving upstream, a load L-2 has substantially traversed zone 3, but still remains on the actuator for zone 3. This depresses the stem 37 of the control valve CV-3 and vents lines 58 and 62. At the same time, the load L-1 has not cleared the sensor 30 of zone 2, thereby also causing depression of the stem 37 of the control valve CV-2 which causes the valve to vent lines 57 and 61. Accordingly, no pressure is directed to the actuator 19 of zone 3 and the piston 20 can be retracted. This permits the drive paddle 18 to move in a counterclockwise direction in zone 3, thereby dropping out the tension roller in that zone and all the commonly connected tension rollers. It will be appreciated that the weight of the tension rollers, combined with forces exerted by the belt, depresses piston 20 of actuator 19 in the zone.

Moving still further upstream, it will also be appreciated that a load L-3 has moved substantially through zone 4, but still depresses the sensor 30 of zone 4. Accordingly, the stem 37 of the control valve CV-4 is depressed, venting any pressure in the line. At the same time, since the load L-2 has not cleared the sensor 30 of zone 3, lines 58 and 62 remain vented and no pressure is available at the actuator 19 of zone 4. Thus, zone 4 tension rollers are dropped out and the zone is disengaged. Accordingly, in the condition as shown in FIG. 1, zones 1 and 2 are running or activated while zones 3 and 4 are temporarily stopped or deactivated. Load L-3 on the stopped conveyor zones 3 and 4 is thus accumulated and spread out from other loads. It will not be moved until zone 3 is again activated. This insures the loads are spaced or "singulated" as they move along the zones.

As soon as the load L-1 clears the sensor 30 in zone 2, air pressure in the control valve CV-2 will serve to extend the piston 37 against the freed sensor in that zone, lifting it, and the control valve CV-2 will return to its normal open condition, thereby pressurizing output 36, and lines 57 and 61. This will insure the engagement, through pressure exerted on port A of the actuator 19 in zone 3, so that the actuator will operate the tension rollers to lift the belt into engagement with the rollers R in zone 3. This will drive the load L-3 deeper into zone 3. Once the load L-3 clears the sensor 30 of zone 4, the control valve CV-4 will extend to its normal condition, thereby pressurizing its output 36, line 59 and port B of the actuator 19 in zone 4. This will drive zone 4 to convey any further packages received from either an upstream conveyor or an upstream accumulator conveyor or zone as appropriate.

Accordingly, it will be appreciated that the operation of any of the zones is contingent upon the condition of the immediate downstream zone as well as the condition of the zone in question.

When it is necessary to fully accumulate loads on the conveyor, a load stop is provided in the pass line P of the conveyor so as to stop an article over the sensor 30 of zone 1. At the same time, the master control valve is operated to connect the input port 1 with output port 2 such that any pressure to extend the piston 20 of the actuator 19 of the discharge zone 1 must be obtained through the control valve CV-1. Since any load on zone 1 under that condition, however, depresses the stem 37 of the control valve CV-1, there will not be any pressure and that zone will remain disengaged until the package is manually moved from the conveyor or the master control valve is switched to connect port 3 with port 2. At the same time a package stop, for example, is removed.

Also, it will be appreciated that as soon as the tension rollers of any zone are dropped out by virtue of the above described operation, the brake shoe 25 and brake arm 26 is rotated by counterclockwise rotation of the shaft 15 in each zone so as to brake a roller such as roller R-4 in zone 2. This prevents any load from coasting through the zone onto the next zone. Of course, it will be appreciated that the sensors and the brake can be disposed in various positions throughout the respective zone so as to achieve any desired braking function. Moreover, it will be appreciated that the weight of the tension rollers, coupled with forces exerted by the tensioned drive belt, serves to provide adequate braking pressures.

Thus, an article accumulates in zone 1, which stops, a following article moves through zone 2 to its sensor, deactivating and braking the zone, a further article moves into zone 3, stopping and braking it, and so on, upstream of the conveyor. The articles thus accumulate in a "zero-pressure" mode without exerting significant pressure on each other.

It will also be appreciated that loads L-1, L-2 and L-3 vary substantially in dimension and in weight. In a preferred embodiment, it will be appreciated that the conveyor 10 is capable of handling loads, such as load L-1, at approximately 100 pounds and as well is capable of handling much lighter loads such as load L-3 which may be much smaller in dimension and weigh as little as 1 pound or less. Also, the conveyor 10 is capable of handling intermediate weight (between 1 and 100 pounds) and dimension loads, such as load L-2 as shown in FIG. 1.

In the preferred embodiment, conveying and accumulating of articles in this load range can be accomplished upon a control and actuating pressure of about 40 psi and without any adjustment. Loads above 100 pounds to about 300 pounds are conveyed and accumulated in the same way by virtue of making only an adjustment to the control and actuating pressure, through preferably a single adjustable pressure regulator, and with no other adjustment to the apparatus, control valves or actuators therefor.

It will also be appreciated that the significant mechanical advantage provided by the sensor 30 enables the depression and actuation of the control valves in each zone by articles varying widely in weight, as mentioned. The combination of the mechanical advantage, together with the utilization of the normally open valve (as opposed to a normally closed valve which is mechanically held open until actuated for closing), is believed to provide this desirable function. While it may be possible to achieve some broadening of a load range in an accumulator conveyor by the mere use of the improved mechanical advantage sensor 30, or by the use of normally open control valve as described herein, a combination of these two components provides an even more beneficial and improved result, enabling the conveyor to handle packages of widely varying weight characteristics without any adjustment of the air pressure.

While the mechanical advantage of the sensor, roller and bracket apparatus has been described, it should also be appreciated that it is obtained without interference from the load carrying rollers, due to use of the curved brackets extending from behind and beneath one load carrying roller to the front thereof. Accordingly, this advantage can be provided in conveyors independent of the load carrying roller centers.

Also, it should be appreciated that the invention incorporates several other mechanical advantages, in addition to that provided by the effective movement arms of the sensor brackets and valve stem actuating paddle. Use of a rotatable synthetic sensor roller reduces frictional forces which must be overcome as the article trips and rides over the sensor. Central disposition of the tension rollers, coupled with the centrally disposed actuator and uniform, parallel and horizontal lifting motion by them, insures full drive belt contact with the load carrying rollers to maximize the drive force imparted for any given actuator pressure, thus most efficiently using the predetermined control and actuator fluid pressure to handle heavier loads.

Still further, the significant mechanical advantage provided by the actuators over the tension rollers through the respective drive paddles 21, 22 and interconnecting links 23, 24, further enhances the capacity of the actuators for a given fluid actuation pressure, thereby increasing drive pressures and serving to broaden the effective load range of the conveyor for a given fluid control and actuating pressure.

It should also be appreciated that the preferred embodiment of the conveyor has been described with respect to handling loads which vary from about 1 pound or less up to about 100 pounds. Adjustment of the air pressure through the pressure regulator valve, for example, enables the conveyor to handle a similarly wide range of loads, but in higher magnitude, such as loads up to about 300 pounds, as noted, and with no other adjustment.

Accordingly, it will be appreciated that the invention provides an improved accumulator conveyor capable of handling widely varying load weights, including loads of weights varying from about 1 pound or less up to about 100 pounds, all without any pressure adjustment, even though the same pressure is utilized for both fluid control and fluid actuation of the respective zones of the conveyor. Loads of up to 300 pounds can be handled in the same way with only adjustment of the common control and actuating pressure being necessary. No different control valves or actuators are required. The invention also provides an improved brake, actuated in part by the weight of all dropped out tension rollers in a zone.

These and other advantages and modifications will become readily apparent to those of ordinary skill in the art, without departing from the scope of this invention and applicant intends to be bound only by the claims appended hereto.

We claim:

1. In an accumulator conveyor having a plurality of belt driven, live rollers disposed in a plurality of selectively driven accumulation zones, for conveying and accumulating articles in a pass line, and having fluid control means and fluid actuation means for said accumulation zones, and operating at a common pressure, the combination of an improved means for sensing articles in said zones and a fluid control valve operated by said sensor means wherein said valve comprises a stem extending therefrom for actuation by said sensor means, and said sensor means comprising:

a pivot shaft, rotatably mounted about a pivot axis disposed between two of said live rollers;
    at least one curved bracket secured to said pivot shaft and mounted for rotation therewith about said pivot axis;
    an article sensing element on one end of said bracket spaced from said pivot axis and disposed in an article pass line, said one bracket end extending upwardly between one of said two live rollers and another downstream live roller;
    a valve stem actuator paddle mounted on said pivot shaft and mounted for rotation therewith about said pivot axis;
    said valve stem actuator paddle engaging said stem at a point spaced from said pivot axis;
    a straight line distance from said pivot axis to said end of said curved bracket being at least about twice the length of a straight line from said pivot axis to said point of valve stem engagement on said paddle;

wherein said fluid control valve is a normally open valve open for fluid flow in its non-activated condition and closed against fluid flow when activated, said normally open valve being actuable to a closed condition, against the pressure exerted by a fluid flowing in said normally open valve, upon rotation of said pivot shaft by said bracket when an article is sensed and the consequent depression of said valve stem by said actuator paddle; and
    further including a single source of fluid at a common pressure for both fluid control and fluid actuation of said accumulation zones, said normally open valve being connected to selectively pass pressurized fluid to said fluid actuation means;
    said conveyor being operable to uniformly accumulate mixed articles of weights varying from less than one pound to about 100 pounds during a constant common fluid pressure.

2. A conveyor as in claim 1, including pressure regulator means for adjusting the pressure of fluid passed to both the fluid control means and the fluid actuating means of said accumulation zones.

3. A conveyor as in claim 1, wherein said fluid actuation means is disposed for selectively tensioning a drive belt against said live rollers and for braking at least one roller in each accumulation zone and said fluid actuating means further including: a second pivot shaft; at least one tension roller support bracket mounted on said second pivot shaft, a tension roller mounted on said bracket; a fluid driven actuator operably mounted for selectively rotating said second shaft in a rotational direction to urge said tension roller against said belt and toward a live-roller and for selectively permitting rotation of said second shaft in an opposite rotational direction to relieve contact of said belt with said live-roller.

4. A conveyor as in claim 3, further including a first drive paddle mounted on said second pivot shaft for rotating said second pivot shaft and wherein said fluid driven actuator includes a selectively extensible piston disposed to engage and rotate said first drive paddle and to rotate said second pivot shaft.

5. A conveyor as in claim 3, further including a brake arm mounted on said second pivot shaft for engaging and braking a live-roller when said actuator is operated to permit rotation of said second pivot shaft in said opposite rotational direction.

6. A conveyor as in claim 4, wherein said fluid actuation means in each zone further includes a plurality of second pivot shafts having drive paddles and belt tension roller support brackets thereon, and belt tension rollers operably mounted on said brackets, and further including link means commonly connecting said plurality of drive paddles with said first drive paddle.

7. A conveyor as in claim 3, wherein said fluid actuator includes an integral shuttle valve having two input ports and being operably connected to an extensible piston.

8. A conveyor as in claim 3, wherein said fluid actuation means is disposed for selectively tensioning a drive belt against said live rollers and wherein said fluid actuating means further includes:

a second pivot shaft having an axis of rotation;
    at least one tension roller support bracket secured to said second pivot shaft, a tension roller mounted on said bracket for rotation about an axis;
    a drive paddle secured to said second pivot shaft;
    a fluid driven actuator operably mounted for selectively engaging said drive paddle and rotating said second shaft in a rotational direction to urge said tension roller against said belt and toward a live-roller, and for selectively permitting rotation of said second shaft in an opposite rotational direction to relieve contact of said belt with said live-roller; and wherein the distance from the point of engagement of said fluid actuator with said drive paddle to an axis of rotation of said second pivot shaft is about twice the distance from said axis of rotation of said second pivot shaft to the axis of rotation of said tension roller.

9. A conveyor as in claim 8, wherein said fluid actuation means in each zone further includes: a plurality of second pivot shafts each having an axis of rotation and drive paddles and belt tension roller support brackets thereon, belt tension rollers operably mounted on said brackets for rotation about tension roller axes, and further including link means commonly connecting said plurality of drive paddles with said drive paddle driven by said fluid driven actuator.

10. A conveyor as in claim 9, wherein the distance between the attachment of each said link means to a drive paddle, respectively, and the axis of rotation of a respective second pivot shaft, is at least about twice the distance from the respective second pivot shaft rotation axis, to a respective axis of rotation of a respective belt tension roller.

11. A fluid controlled, fluid actuated, belt driven, live-roller accumulating brake conveyor having a drive belt, a plurality of belt driven, load carrying rollers disposed in a plurality of selectively driven and braked accumulation zones defining a common article pass line, tension rollers for selectively urging said belt into engagement with load carrying rollers of respective zones, and brake means in each zone for selectively engaging at least a load carrying roller in each zone, said conveyor further comprising:
   a normally open fluid control valve operatively associated with each zone and being open for fluid flow in its non-activated condition and closed against fluid flow when activated;
   a fluid driven actuator means in each zone for selectively urging said belt into engagement with load carrying rollers in each zone, when said fluid control valve in the zone is normally open;
   integrated fluid circuit means operating on a common fluid pressure from a single pressurized fluid source and operatively interconnecting said fluid control valves and said fluid driven actuator means;
   an article sensor including a pivot shaft between two load carrying rollers, a curved bracket mounted on said shaft and extending from said pivot shaft between two load carrying rollers around one of said rollers and upwardly into said pass line from beneath said one load carrying roller, a paddle mounted on said pivot shaft for operably engaging said normally open fluid control valve and closing said valve when an article in said pass line rotates said bracket and said shaft, said bracket, pivot shaft and paddle providing a mechanical advantage of at least about 2 with respect to operation of said valve by said article; and
   said conveyor being operable to selectively convey and uniformly accumulate mixed articles of weights varying from less than one pound to about 100 pounds during a constant common fluid pressure.

12. An accumulator conveyor for selectively conveying and accumulating articles therealong and having a plurality of accumulation zones defining an article pass line, said conveyor including in combination,
   means in each zone for conveying articles along said pass line;
   means for selectively actuating said conveying means in each zone;
   normally open valve means open for fluid flow in non-activated condition and closed against fluid flow when activated for controlling said actuating means to selectively actuate and deactuate said conveying means at least partially in response to the sensing of articles at predetermined locations in said pass line,
   said actuating means and said normally open valve means being respectively interconnected with a common fluid pressure system operating at a predetermined common fluid pressure and being selectively operable at a single predetermined common fluid pressure to convey and to accumulate a plurality of discrete articles varying in weight within the range of from less than one pound to about 100 pounds.

13. An accumulator conveyor as in claim 12 further including braking means also actuated by said common fluid pressure system, said conveying means, actuating means and normally open valve means cooperating with said braking means to accumulate said articles in a zero-pressure mode.

14. An accumulator conveyor as in claim 12 wherein said normally open valve means has a predetermined system inertia generated in part by said common fluid pressure, and wherein said normally open valve means is operated by each of said discrete articles regardless of its weight against said respective inertia.

15. An accumulator conveyor as in claim 14 wherein said common fluid pressure is a function of the weight of the heavier articles conveyed and accumulated.

16. An accumulator conveyor for selectively conveying and accumulating articles therealong and having a plurality of accumulation zones defining an article pass line, said conveyor including in combination,
   means in each zone for conveying articles along said pass line;
   means for selectively actuating said conveying means in each zone;
   normally open valve means open for fluid flow in non-activated condition and closed against fluid flow when activated for controlling said actuating means to selectively actuate and deactuate said conveying means at least partially in response to the sensing of articles at predetermined locations in said pass line,
   said actuating means and said normally open valve means being respectively interconnected with a common energy system operating at a common predetermined energy level and being selectively operable at a single common predetermined energy level to convey and to accumulate a plurality of discrete articles varying in weight within the range of from less than one pound to about 100 pounds.

17. A method of conveying and accumulating discrete articles, varying in weight, along a pass line in an accumulator conveyor having plural conveying means disposed in respective article accumulation zones together with means for actuating said conveying means and a normally open valve means of the type open for fluid flow in its non-activated condition and closed against fluid flow when activated, said actuating means and said normally open valve means being operably connected together in a common energy system, the method including the steps of:

passing fluid through said normally open valve means in a respective zone to said actuating means in a respective zone and thereby actuating said conveying means in the respective zone to convey articles therealong in said pass line, sensing an article in said respective zone, in response the said sensing, selectively activating said normally open valve means to a closed condition and thereby interrupting flow of fluid through said valve means to said actuating means for stopping the conveying means in the zone, and in the absence of said sensing, selectively deactivating said normally open valve means to an open condition and passing fluid therethrough to said actuating means to actuate said conveying means in the respective zone.

* * * * *

UNITED STATES PATENT AND TRADEMARK OFFICE
CERTIFICATE OF CORRECTION

PATENT NO. : 4,854,445

DATED : August 8, 1989

INVENTOR(S) : Daniel T. Eaton and George W. Benningfield

It is certified that error appears in the above-identified patent and that said Letters Patent is hereby corrected as shown below:

Column 3, line 24, "simulate" should be --singulate--.

Column 9, line 53, insert "1" after --zone--.

Column 9, line 55, delete "1" after the word --zone--.

Column 14, line 58, delete "3" and insert --1--.

Signed and Sealed this

Third Day of July, 1990

Attest:

HARRY F. MANBECK, JR.

*Attesting Officer*     *Commissioner of Patents and Trademarks*